(12) United States Patent
Liao

(10) Patent No.: US 10,505,803 B2
(45) Date of Patent: Dec. 10, 2019

(54) POWER-EFFICIENT OPERATION FOR WIDER BANDWIDTH

(71) Applicant: MEDIATEK INC., Hsinchu (TW)

(72) Inventor: Pei-Kai Liao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/008,024

(22) Filed: Jun. 14, 2018

(65) Prior Publication Data

US 2018/0367386 A1    Dec. 20, 2018

Related U.S. Application Data

(60) Provisional application No. 62/519,923, filed on Jun. 15, 2017, provisional application No. 62/544,118, filed on Aug. 11, 2017.

(51) Int. Cl.
*H04L 12/24* (2006.01)
*H04W 52/14* (2009.01)
(Continued)

(52) U.S. Cl.
CPC .......... *H04L 41/0833* (2013.01); *H04L 5/001* (2013.01); *H04L 5/0048* (2013.01); *H04L 5/0053* (2013.01); *H04L 5/0092* (2013.01); *H04W 48/00* (2013.01); *H04W 52/146* (2013.01); *H04W 48/12* (2013.01); *H04W 72/042* (2013.01)

(58) Field of Classification Search
None
See application file for complete search history.

(56) References Cited

U.S. PATENT DOCUMENTS

2015/0131563 A1    5/2015    Guo et al. ............... 370/329
2018/0063865 A1*   3/2018    Islam ................. H04W 76/27
(Continued)

FOREIGN PATENT DOCUMENTS

CN          103580819 A      2/2014

OTHER PUBLICATIONS

International Search Report and Written Opinion of International Search Authority for PCT/CN2018/091476 dated Sep. 10, 2018 (9 pages).

(Continued)

*Primary Examiner* — Eunsook Choi
(74) *Attorney, Agent, or Firm* — Imperium Patent Works; Helen Mao; Zheng Jin

(57) ABSTRACT

Apparatus and methods are provided for power-efficient operation for wide bandwidth. In one novel aspect, the configuration of the CORESET with CSS includes at least one of the time duration of the CORESET within a slot and the periodicity of the CORESET burst. In another embodiment, each configured BWP includes at least one CORESET with UE-specific search space and one CORESET with CSS. In another embodiment, at least one of the configured BWPs includes one CORESET with type-1 CSS for PCell. Each configured BWPs includes one CORESET with type-2 CSS for both PCell and SCell and at least one CORESET with UE-specific search space for PCell and SCell. In another novel aspect, a timer-triggered transmission of activating DL BWP indication in all DL BWP configured is used when the UE mis-detects or false-alarms the explicit signaling for BWP switch.

28 Claims, 7 Drawing Sheets

(51) Int. Cl.
*H04L 5/00* (2006.01)
*H04W 48/00* (2009.01)
*H04W 72/04* (2009.01)
*H04W 48/12* (2009.01)

(56) References Cited

U.S. PATENT DOCUMENTS

2018/0279218 A1* 9/2018 Park .................. H04W 48/20
2018/0279229 A1* 9/2018 Dinan ................ H04W 52/146
2018/0279289 A1* 9/2018 Islam ................. H04W 72/048
2018/0324770 A1* 11/2018 Nogami .............. H04L 5/0053

OTHER PUBLICATIONS

R1-1707626 3GPp TSG RAN WG1 Meeting #89, LG Electronics, "Discussion on CORESET Configuration", Hangzhou, P.R. China, May 15-19, 2017 (5 pages).
R1-1709265 3GPP TSG RAN WG1 Meeting #89, Oppo et al., "WF on band width part configuration", Hangzhou, P.R. China, May 15-19, 2017 (5 pages).
R1-1706900 3GPP TSG RAN WG1 Meeting #89, Huawei et al., "On bandwidth part and bandwidth adaptation", Hangzhou, P.R. China, May 15-19, 2017 (9 pages).

* cited by examiner

POWER-EFFICIENT OPERATION FOR WIDER BANDWIDTH

CROSS REFERENCE TO RELATED APPLICATIONS

This application claims priority under 35 U.S.C. § 119 U.S. provisional application 62/519,923 entitled "POWER-EFFICIENT OPERATION FOR WIDER BANDWIDTH" filed on Jun. 15, 2017, and application 62/544,118 entitled "METHODS OF POWER-EFFICIENT OPERATION IN WIDEBAND CARRIER" filed on Aug. 11, 2017, the subject matter of which is incorporated herein by reference.

TECHNICAL FIELD

The disclosed embodiments relate generally to wireless communication, and, more particularly, to methods and apparatus for power-efficient operation for wider bandwidth.

BACKGROUND

Mobile networks communication continues to grow rapidly. The mobile data usage will continue skyrocketing. New data applications and services will require higher speed and more efficient. Large data bandwidth application continues to attract more consumers. New technologies are developed to meet the growth such as carrier aggregation (CA), which enables operators, vendors, content providers and the other mobile users to meet the increasing requirement for the data bandwidth. However, carrier aggregation assumes multiple RF chains for signal reception even for physically contiguous spectrum, which introduces long transition time to activate more carriers from one carrier for larger data bandwidth and decreases the efficiency of the data transmission.

In frequency bands above 3 GHz, there could be a block of physically continuous spectrum up to hundreds of MHz. The single carrier operation for such large continuous spectrum is more efficient in both the physical (PHY) control, with lower control signaling overhead, and PHY data, with higher trunking gains. It is, therefore, to configure the large contiguous spectrum for large data transmission instead of configuring multiple small spectrum resources. However, from the system level, not all the user equipment (UEs) require large channel bandwidth. Further, for each UE, not all applications require large channel bandwidth. Given that wideband operation requires higher power consumption, the use of the large spectrum resource for control signaling monitoring and low-data-rate services is not ideal for power saving and bandwidth efficiency.

A 5G base station should be able to support UEs operating with single wideband carrier & UEs operating with intra-band carrier aggregation over the same contiguous spectrum simultaneously. It is also agreed that UE RF bandwidth adaptation is supported for both single-carrier operation and each serving cell in carrier aggregation. How to support UEs operating with single wideband carrier and UEs operating with intra-band carrier aggregation over the same contiguous spectrum simultaneously requires new designs.

Improvements and enhancements are required to facilitate 5G base station to support UEs operating with single wideband carrier & UEs operating with intra-band carrier aggregation over the same contiguous spectrum simultaneously and to facilitate the power-efficient operation for wider bandwidth.

SUMMARY

Apparatus and methods are provided for power-efficient operation for wide bandwidth. In one novel aspect, the UE is configured with one or more BWPs per cell (or carrier). The UE receives the first configuration of the second-part SI including at least a DL bandwidth for the second-part SI embedded in a first-part SI carried in a DL broadcast channel, receives a second configuration of one or more DL control resource sets (CORESET) with CSS in the first-part SI including at least a time duration for each DL CORESET, and determines time-frequency resources of each DL CORESET with CSS based on the DL bandwidth and time duration for corresponding DL CORESET. The UE receives SI based on the DL scheduler in the CSS of the one or more CORESET. In one embodiment, the configuration of the CORESET with CSS includes at least one of the time duration of the CORESET within a slot, the periodicity of the CORESET burst, and the number of contiguous slots where the CORESET exists in one periodicity. In another embodiment, each configured BWP includes at least one CORESET with UE-specific search space. At least one of the configured BWP includes one CORESET with CSS.

In another embodiment, the CORESET with CSS is configured as two types, the type-1 CSS for broadcast messages, which is cell-specific and may require beam sweeping; and the type-2 CSS for multi-cast messages, which is group-specific. In one embodiment, at least one of the configured BWPs includes one CORESET with type-1 CSS for PCell. Each configured BWP includes one CORESET with type-2 CSS for both PCell and SCell. Each configured BWP includes at least one CORESET with UE-specific search space for PCell and SCell. In yet another embodiment, a first BWP is indicated as an active BWP and for each configured DL BWP on the PCell at least one of CORESET with CSS is configured comprising a type-1 CSS for SI, a type-1 CSS for paging, and a type-2 CSS for random access is configured.

In another novel aspect, a timer-triggered transmission of activating DL BWP indication in all DL BWP configured is used when the UE mis-detects or false-alarms the explicit signaling for active BWP switch. In one embodiment, the DCI is a dedicated BWP switch signaling. In another embodiment, the DCI is a DCI for DL/UL scheduling.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
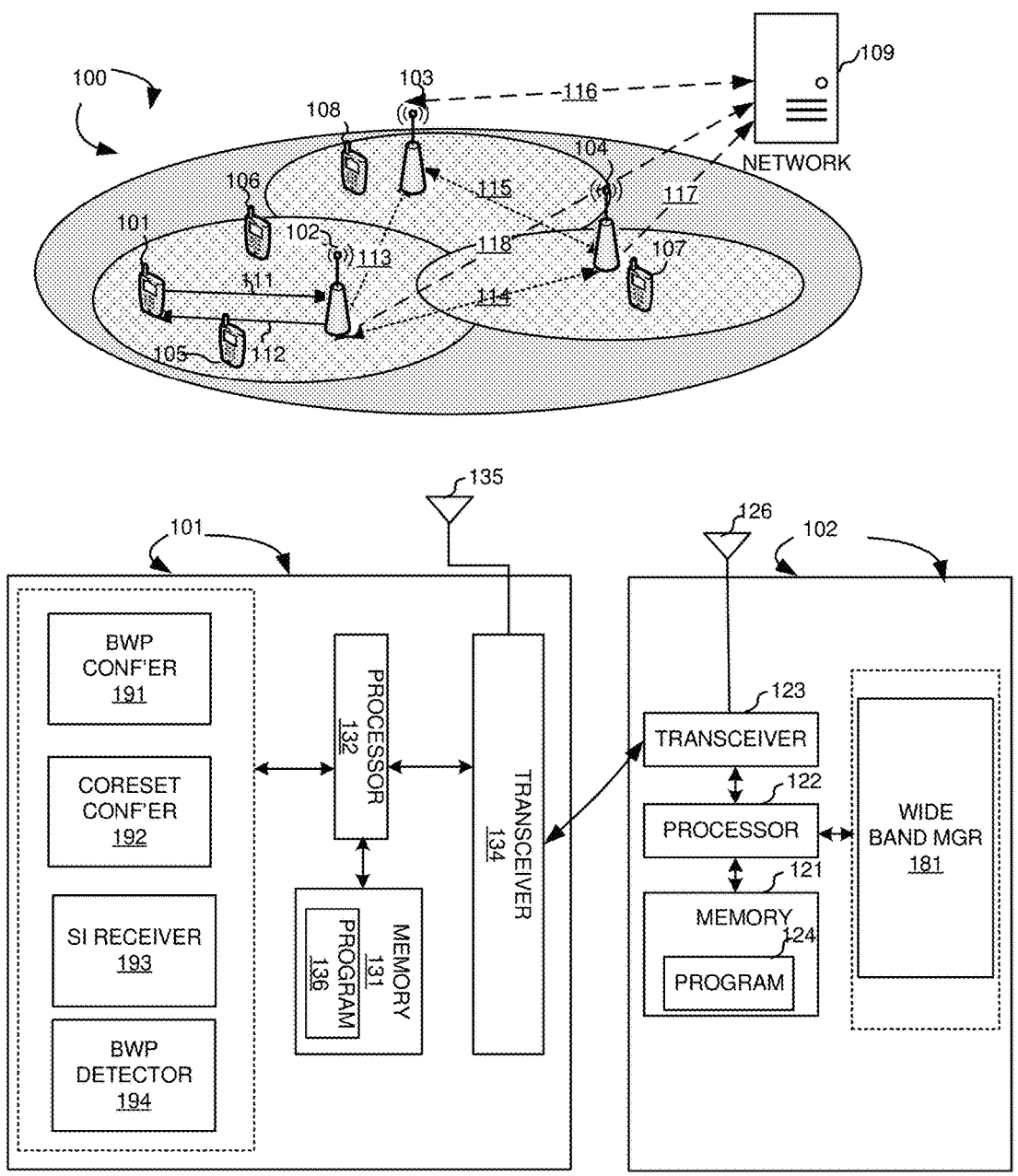
FIG. 1 illustrates a system diagram of a wireless network with one more BWPs and one or more CORESETs configured in accordance with embodiments of the current invention.

FIG. 1 illustrates a system diagram of a wireless network 100 with one or more BWPs and one or more CORESETs configured per cell (or carrier) in accordance with embodiments of the current invention. Wireless communication system 100 includes one or more wireless networks each of the wireless communication network has fixed base infrastructure units, such as receiving wireless communications devices or base unit 102 103, and 104, forming wireless networks distributed over a geographical region. The base unit may also be referred to as an access point, an access terminal, a base station, a Node-B, an eNode-B, a gNB, or by other terminology used in the art. Each of the base unit 102, 103, and 104 serves a geographic area. Backhaul connections 113, 114 and 115 connect the non-co-located receiving base units, such as 102, 103, and 104. These backhaul connections can be either ideal or non-ideal A wireless communications device 101 in wireless network 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103.

In one novel aspect, wireless communication network 100 operates with large contiguous radio spectrums. UE 101 while accessing wireless communication network 100, acquires synchronization information and system information using primary SS anchor. An SS block consists of synchronization signals and physical broadcast channel carries necessary system information for starting initial access procedure. UE RF bandwidth adaptation is supported. For more efficient operation of supporting the bandwidth adaptation, one or more bandwidth part (BWP) candidates with configuration parameters are configured per cell (or carrier). The BWP configuration parameters includes BWP numerology, such as subcarrier spacing and cyclic prefix (CP) length, the frequency location of the BWP and the BWP bandwidth. A BWP may include SS block. UE 101 may be configured with one or more BWPs per cell (or carrier). UE 101 is configured with at least one active DL/UL BWP at any given time. A DL BWP includes at least one control resource (CORESET) for the case of signal active DL/UL BWP at a given time. Each CORESET contains the time-frequency radio resource reserved to accommodate the schedulers for the DL/UL data. UE 101 can be configured with one or more COREETs. A CORESET with a set of candidate locations for the schedulers of system information broadcast, DL broadcast or multi-cast data is a common search space (CSS) CORESET. A CORESET with a set of candidate locations for the schedulers of DL/UL unicast data is a UE-specific search space CORESET.

FIG. 1 further shows simplified block diagrams of wireless device/UE 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a wide band manager 181 that configures BWP, CORESET and communicates with UEs to implement the wide band operations.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. These functions can be implemented in software, firmware and hardware. A BWP configurator 191 configures one or more BWPs for UE 101 in a wireless communication network, wherein each BWP includes a plurality of continuous physical resource blocks (PRBs), and wherein the UE is configured with a primary cell (PCell) and one or more secondary cells (SCells). A CORESET configurator 192 receives a first configuration of a second-part broadcast system information (SI) embedded in a first-part of broadcast SI carried in a downlink (DL) broadcast channel by the UE, wherein the first configuration includes at least a DL bandwidth for the second-part broadcast SI, receives a second configuration of one or more DL CORESET with CSS in the first-part of broadcast SI, wherein the second configuration includes at least a time duration for each DL CORESET, and determines time-frequency radio resources of each DL CORESET with CSS based on the DL bandwidth for the second-part broadcast SI and the time duration for corresponding DL CORESET. A SI receiver 193 receives SI based on a DL scheduler in the CSS of the one or more DL CORESET. A BWP activator 194 detects a DL BWP activation signal to activate a first BWP, wherein the DL BWP activation signal is sent to all configured BWPs through a timer-triggered transmission from a gNB that failed to receive any uplink (UL) transmission from the UE when a gNB-side BWP-timer expired, and wherein the gNB-side BWP-timer is started by the gNB when a previous BWP activation signal is sent to the UE to activate the first BWP, and activates the first BWP based on the detected DL BWP activation signal.

In one novel aspect, broadcast system information (SI) is partitioned into three parts. The UE is configured with one or more carriers with one primary cell (PCell) and one or more secondary (SCells). One or more BWPs are configured for the UE. One or more CORESETs are also configured.

Figure 2:
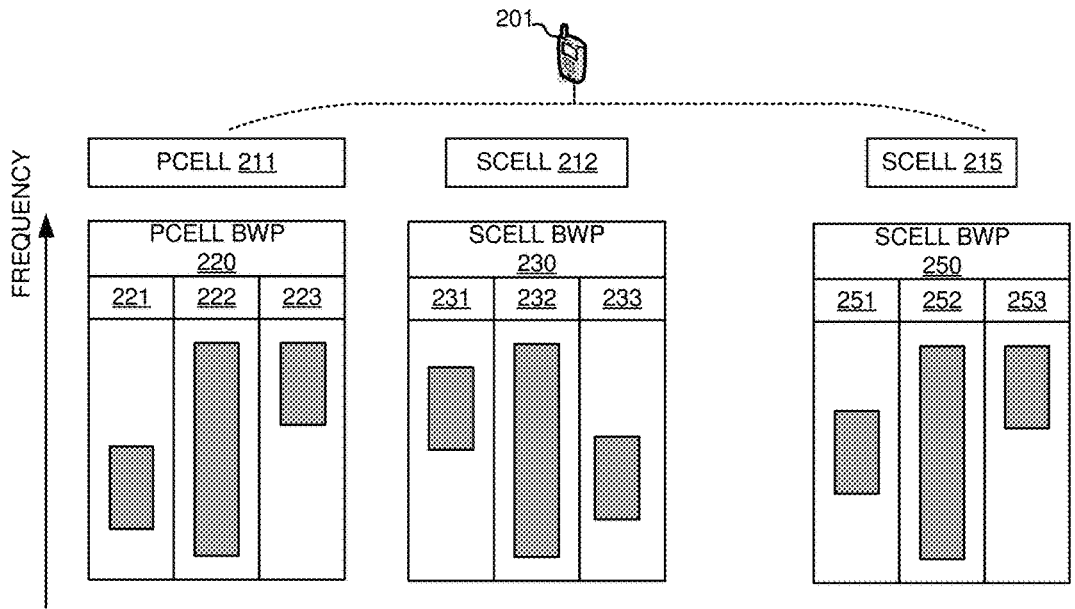
FIG. 2 illustrates an exemplary diagram for a UE configured with BWPs in accordance with embodiments of the current invention.

FIG. 2 illustrates an exemplary diagram for a UE configured with BWPs in accordance with embodiments of the current invention. A UE 201 is configured with multiple carriers. As an example, UE 201 has a PCell 211, a SCell 212 and a SCell 215. Each configured carrier is configured with BWPs. PCell BWP 220 is configured with BWP 221, 222, and 223. SCell BWP 230 is configured with BWP 231, 232, and 233. PCell BWP 250 is configured with BWP 251, 252, and 253. Each configured BWP has its numerology, including the CP type and the subcarrier spacing. BWP configuration also includes the frequency location of the BWP, a bandwidth size of the BWP. In one embodiment, the frequency location is the offset between the center frequency of the BWP and a reference point, which is implicitly or explicitly indicated to the UE based on a common physical resource block (PRB) index for a given numerology. The bandwidth size of the BWP can be the number of contiguous PRBs of the BWP. In another embodiment, a CORESET is required for each BWP configuration when there is a single active DL BWP.

Figure 3:
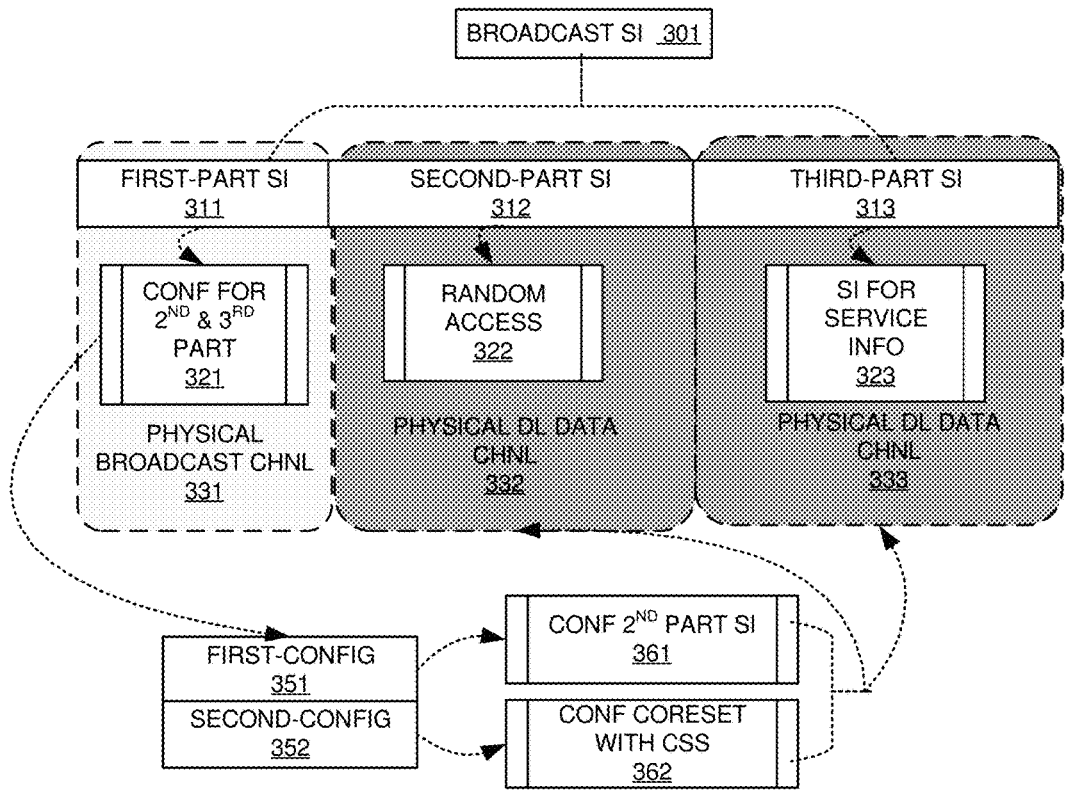
FIG. 3 illustrates an exemplary diagram for the broadcast SI configuration in accordance with embodiments of the current invention.

FIG. 3 illustrates an exemplary diagram for the broadcast SI configuration in accordance with embodiments of the current invention. In one embodiment, the broadcast SI 301 is portioned into three parts: the first-part SI 311, the second-part SI 312, and the third-part SI 313. First-part SI 311 includes configuration for second-part SI and third-part SI 321 and is broadcasted on a physical broadcast channel 331. First-part SI 311 includes the necessary information for the UE to receive the second-part and the third-part of broadcast SI. Second-part SI 312 includes configuration for random access 322 and is carried on a DL physical data channel 332. Second-part SI 312 contains the necessary information for a UE to perform random access procedure to get connected with the network. Third-part SI 313 includes at least SI for network service information and is carried on a DL physical data channel 333. Third-part SI 313 contains all remaining system information necessary for services the network can provide to UEs. The physical DL data channel 332 and 333 that carry second-part SI and third-part Si is scheduled by a scheduler within a CORESET.

In one novel aspect, first-part SI 311 includes a first configuration 351 and a second configuration 352. First configuration 351 includes configuration 361 that configures a second-part SI or the second-part and the third-part SI. Second configuration 352 includes configuration 362 that configures one or more CORESET with CSS. The UE determines the time-frequency resources of each DL CORESET with CSS based on configuration information received in first configuration 351 and second configuration 352. The UE receives SI based on a DL scheduler in the CSS of the DL CORESET.

The first-part of broadcast system information carries configuration of second-part broadcast SI, which includes numerology, such as CP length and subcarrier spacing, frequency location, and bandwidth size. The frequency location can be the center frequency, the starting PRB based on the configured numerology or other valid configurations. The bandwidth can be the number of PRBs based on the configured numerology.

In a first embodiment, the first-part SI also carriers configuration of a CORESET with CSS for the scheduler of the second-part SI, which includes at least one of the followings 1) the time duration of the CORESET within a slot, such the number of contiguous OFDM symbols; 2) the periodicity of a CORESET burst; and 3) the number of contiguous slots where the CORESET exists in one periodicity. The first-part SI may further include the bandwidth size of the CORESET follows the bandwidth size for the second-part SI of the broadcast system information.

In a second embodiment, the first-part SI also carriers configuration of a CORESET with CSS for the scheduler of the second-part SI and the third-part SI, which includes at least one of the followings 1) the time duration of the CORESET within a slot, such the number of contiguous OFDM symbols; 2) the periodicity of a CORESET burst; and 3) the number of contiguous slots where the CORESET exists in one periodicity. The first-part SI may further include the bandwidth size of the CORESET follows the bandwidth size for the second-part SI and the third-part SI of broadcast system information.

In a third embodiment, the first-part SI also carriers configuration of a CORESET with CSS for the scheduler of the second-part SI, which includes at least one of the followings the time duration of the CORESET within a slot. The first-part SI may further include the bandwidth size of the CORESET follows the bandwidth size for the second-part SI of broadcast system information.

In a fourth embodiment, the first-part SI also carriers configuration of a CORESET with CSS for the scheduler of the second-part SI and the third-part SI, which includes at least one of the followings the time duration of the CORESET within a slot. The first-part SI may further include the bandwidth size of the CORESET follows the bandwidth size for the second-part SI and the third-part SI of broadcast system information.

DL common BWP is defined as a contiguous bandwidth which can be supported by all served UEs, wherein there are at least synchronization signals, first-part SI and second-part SI of broadcasted system information and low-rate data.

Figure 4:
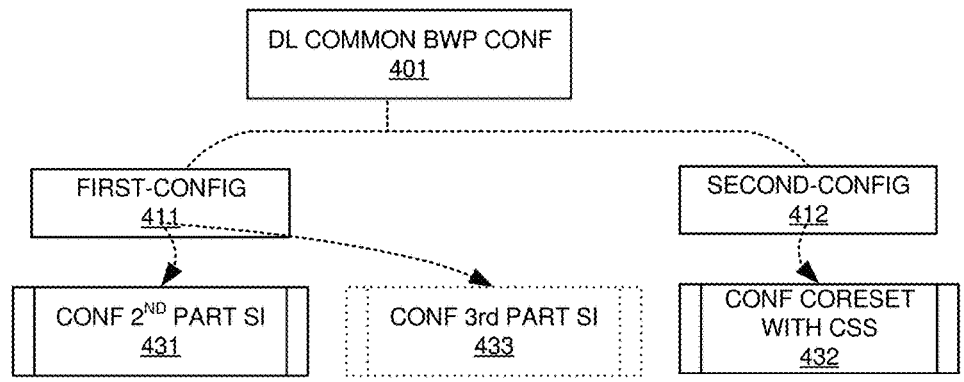
FIG. 4 illustrates an exemplary diagram of a DL common BWP configuration in accordance with embodiments of the current invention.

FIG. 4 illustrates an exemplary diagram of a DL common BWP configuration in accordance with embodiments of the current invention. A DL common BWP configuration 401 includes at least a first configuration 411 and a second configuration 412. First configuration 411 includes information 431 that configures the second-part SI and optional information 433 that configures third-part SI. Second configuration 412 includes at least information 432 that configures CORESET with CSS.

DL common BWP configuration broadcasted in the first-part SI of the broadcast system information includes at least one of the following configurations of second-part broadcast SI, configuration of a CORESET with CSS of a scheduler, the bandwidth size of the CORESET, and the transmission configuration of data service over DL common BWP. The configurations of second-part broadcast SI include numerology, such as CP length and subcarrier spacing, frequency location, and bandwidth size. The frequency location can be the center frequency, the starting PRB based on the configured numerology or other valid configurations. The bandwidth can be the number of PRBs based on the configured numerology.

In a first embodiment, the configuration of a CORESET with CSS scheduler of the second-part SI includes the time duration within a slot, such as the number of contiguous OFDM symbols. The bandwidth size of the CORESET follows the bandwidth size for second-part SI.

In a second embodiment, the configuration of a CORESET with CSS scheduler of the second-part SI and the third-part SI includes the time duration within a slot, such as the number of contiguous OFDM symbols. The bandwidth size of the CORESET follows the bandwidth size for second-part SI and third-part SI.

In a third embodiment, the configuration of a CORESET with CSS scheduler of the second-part SI includes at least one of 1) the time duration of the CORESET within a slot, such the number of contiguous OFDM symbols; 2) the periodicity of a CORESET burst; and 3) the number of contiguous slots where the CORESET exists in one periodicity. The bandwidth size of the CORESET follows the bandwidth size for second-part SI.

In a fourth embodiment, the configuration of a CORESET with CSS scheduler of the second-part SI and the third-part SI includes at least one of 1) the time duration of the CORESET within a slot, such the number of contiguous OFDM symbols; 2) the periodicity of a CORESET burst; and 3) the number of contiguous slots where the CORESET exists in one periodicity. The bandwidth size of the CORESET follows the bandwidth size for second-part SI and third-part SI.

In addition to numerology, frequency location and bandwidth, the BWP configuration may further includes UE TX/RX antenna number. In one embodiment, the maximal number TX/RX physical antenna number the UE can apply is included. In another embodiment, the maximal number TX/RX antenna ports the UE can assume is included. In yet another embodiment, the maximal number TX/RX spatial layers the UE can assume is included.

In another embodiment, the UE can switch among configured BWPs with different BWP configurations, which enables the adaptation of UE TX/RX antenna number. The BWP switch can be based two or more combined methods including a higher-layer signaling, such as the RRC-layer signaling or a MAC CE; a physical-layer signaling, such as the DL control information (DCI); and the time pattern.

The UE broadcast and/or multi-cast message includes at least the system information, the random access (RA) response in RA procedure, paging control for system information update, the group-based UL transmission power control (TPC) command, and scheduling of multi-cast services.

Figure 5A:
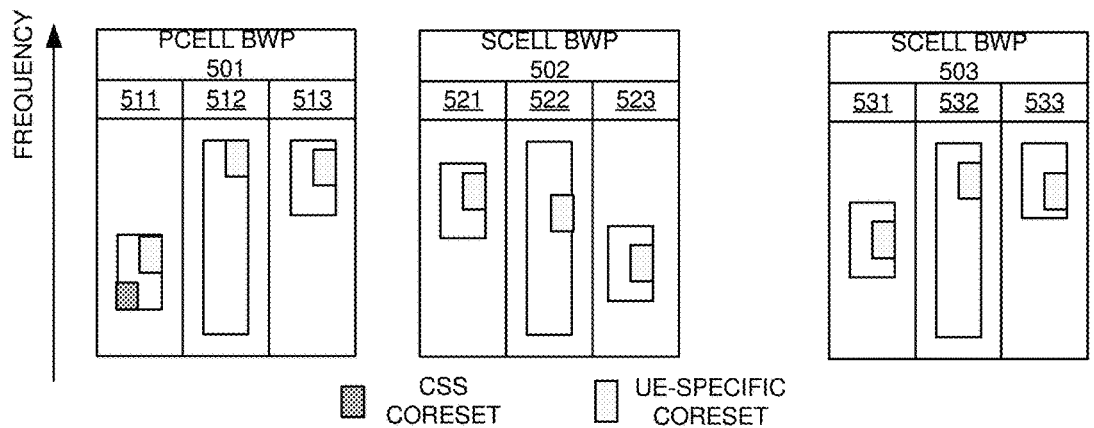
FIG. 5A illustrates exemplary diagrams of UE BWP configurations with CSS CORESET and UE-specific CORESET in accordance with embodiments of the current invention.

FIG. 5A illustrates exemplary diagrams of UE BWP configurations with CSS CORESET and UE-specific CORESET in accordance with embodiments of the current invention. The UE is configured with one or multiple carriers. In one example, the UE is configured with a PCell 501, an SCell 502 and an SCell 503. PCell BWP 501 includes BWPs 511, 512, and 513. SCell BWP 502 includes BWPs 521, 522, and 523. SCell 503 BWP includes BWPs 531, 532, and 533. When there is single BWP active at any given time for the UE, each configured BWP, such as 511-513, 521-523, and 531-533 includes at least one CORESET with UE-specific search space and at least one of the configured BWPs include one CORESET with CSS, such BWP 511.

Figure 5B:
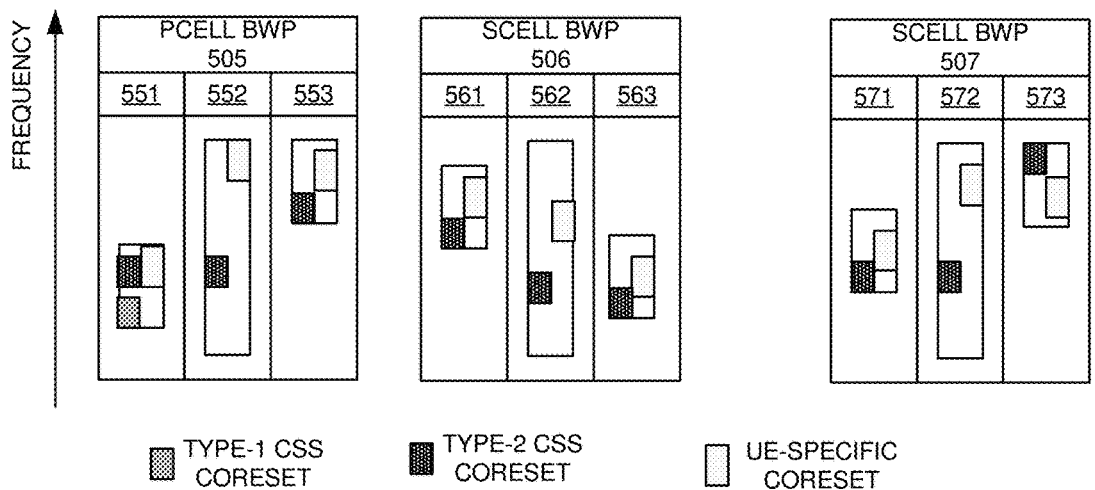
FIG. 5B illustrates exemplary diagrams of UE BWP configurations with type-1 CSS CORESET, type-2 CSS CORESET and UE-specific CORESET in accordance with embodiments of the current invention.

FIG. 5B illustrates exemplary diagrams of UE BWP configurations with type-1 CSS CORESET, type-2 CSS CORESET and UE-specific CORESET in accordance with embodiments of the current invention. In another embodiment, CSS for the broadcast message is configured to the type-1 CSS and the type-2 CSS. The type-1 CSS includes broadcast messages such as the system information and paging. The type-2 CSS includes multicasting messages, such as the RA response in the RA procedure, paging control SI update, group-specific commands, and the scheduling. In one example, the UE is configured with a PCell 505, an SCell 506 and an SCell 506. PCell BWP includes BWPs 551, 552, and 553. Scell BWP 506 includes BWPs 561, 562, and 563. SCell 507 BWP includes BWPs 571, 572, and 573. When there is single BWP active at any given time for the UE, each configured BWP, such as 561-563, 561-563, and 571-573 includes at least one CORESET with UE-specific search space, one type-2 CSS CORESET. At least one of the configured BWPs include one CORESET with CSS for PCell, such BWP 551.

In one embodiment, for the case of single active BWP at a given time within a cell or carrier, at least one of the configured BWPs includes one CORESET with type-1 CSS for PCell, such BWP 551. Each configured BWPs includes one CORESET with type-2 CSS for both the PCell and the SCell. Each configured BWP includes at least one CORESET with UE-specific search space for PCell and the SCell. In another embodiment, a first BWP is configured as an active BWP and for each configured DL BWP on the PCell at least one of CORESET with CSS is configured comprising a type-1 CSS for SI, a type-1 CSS for paging, and a type-2 CSS for random access is configured.

In one embodiment, the UE is configured with CSS in one BWP and the active BWP does not have the CSS configured. A periodic time gap for CSS space monitoring is configured for the UE.

Figure 6:
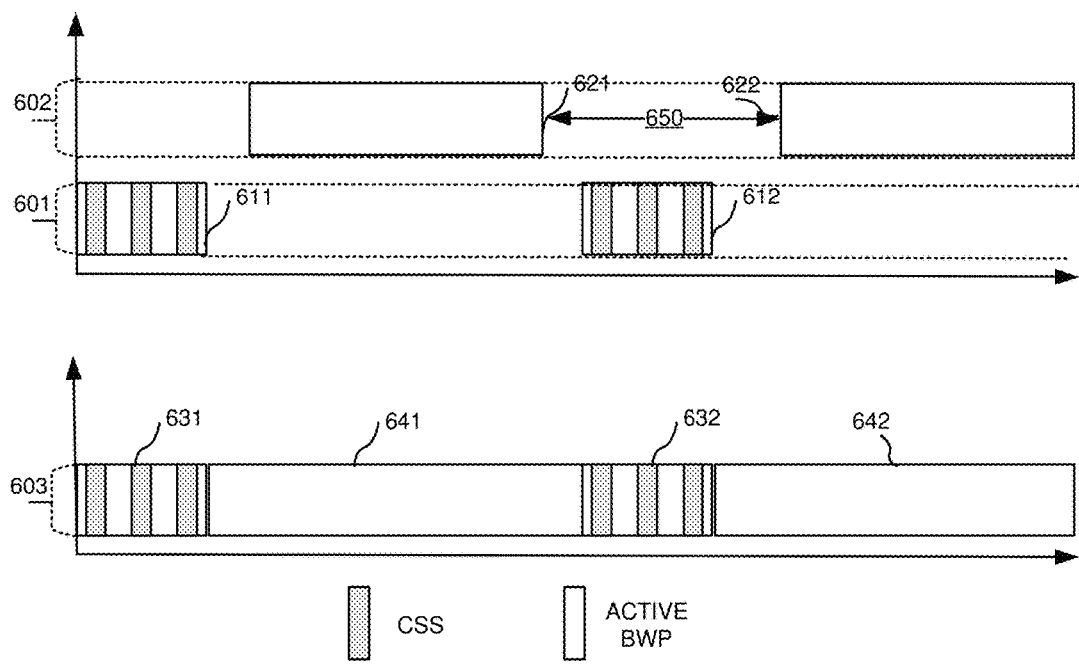
FIG. 6 illustrates exemplary diagrams of the periodic time gap for CSS search space monitoring in accordance with embodiments of the current invention.

FIG. 6 illustrates exemplary diagrams of the periodic time gap for CSS search space monitoring in accordance with embodiments of the current invention. The UE is configured with a periodic time gap for common search space monitoring. In one scenario, when the active BWP and the CSS are both in the same BWP, such as BWP 603, there is no need for BWP switching. The UE can monitor both CSS and UE-specific space in its active BWP without applying the configured time gap if its current active BWP includes a CORESET with CSS. As illustrated, CSS block 631, 632 and the active BWP block 641 and 642 are both on BWP 603. There is no need for BWP switching.

If the current active BWP for the UE does not include a CORESET with CSS, the UE can switch its active BWP to the one including a CORESET with CSS scheduler during the time gap for the monitoring of broadcast message, such as SI, RA response, paging control, and etc. As illustrated, BWP 602 is the active BWP and BWP 601 is not active. BWP 601 is configured with CSS and BWP 602 is not configured with CSS. In one embodiment, the UE is configured with a periodic time gap 650 for CSS monitoring. The periodic time gap configuration includes at least one of the followings the periodicity, the time gap length, and a BWP including CORESET with CSS for monitoring, such BWP 601. The UE switches its active BWP to BWP 601 during monitoring gap and monitoring block 611 and 612 when switched. The UE switches back to BWP 602 at blocks 621 and 622.

Figure 7:
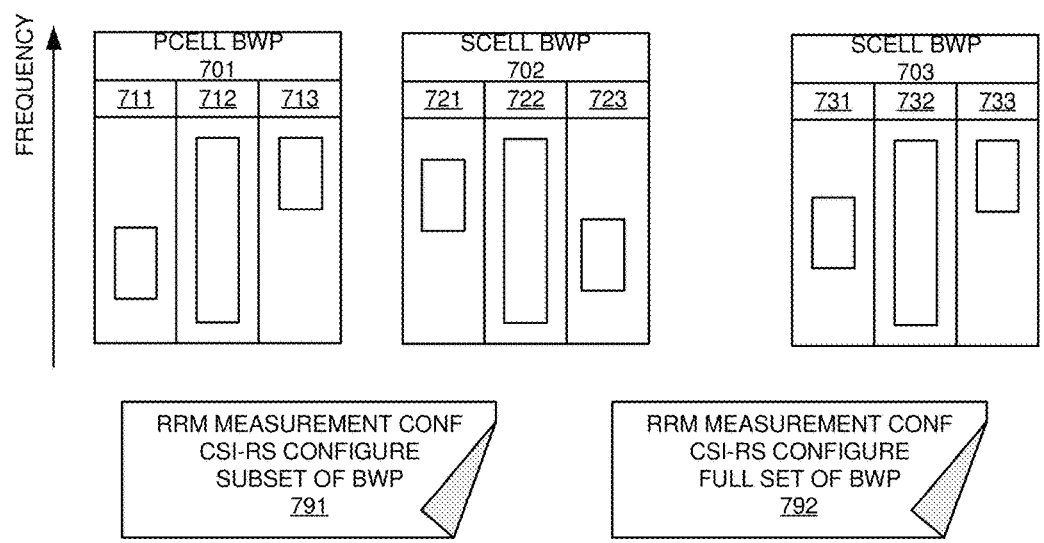
FIG. 7 illustrates exemplary diagrams of the radio resource management (RRM) measurements with BWP configured in accordance with embodiments of the current invention.

FIG. 7 illustrates exemplary diagrams of the radio resource management (RRM) measurements with BWP configured in accordance with embodiments of the current invention. In new radio technology (NR), there are two types of RRM measurement and reporting defined. The first is the SS-block RRM measurement, where the UE performs the RRM measurement with at least SS signal. The second is the CSI-RS RRM measurement, where the UE performs the CSI-RS RRM measurement with CSI-RS. As illustrated, the UE is configured with PCell BWP 701 including BWPs 711, 712, and 713; a SCell BWP 702 including BWPs 721, 722, and 723, and a SCell BWP 703 including BWPs 731, 732, and 733. In one embodiment, the UE receives CSI-RS RRM MEASUREMENT configuration, which includes at least at least one of CSI-RM measurement configurations in a set of configured BWPs, and CSI-RM RRM measurement configurations outside the configured BWPs. The configuration in a set of configured BWPs includes the active BWP. The set of the configured BWPs can be a subset of all the configured BWPs, such as 791, or the full set of the all the configured BWPs, such as 792. The UE performs CSI-RS RRM measurement based on the received configuration.

In one novel aspect, the network signals active BWP indication by explicit signaling carried in the DCI to the UE. The DCI can be either dedicated DCI for the active BWP switch or a DL/UL scheduling DCI. The problem could occur when the UE failed to detect the BWP DCI or false-alarms the explicit signaling carried in the DCI. The issue is resolved using the timer-triggered transmission of active DL BWP indication in all DL BWP configured to the UE. A gNB-side BWP-timer is started by the gNB when it does not receive any UL transmission over the active UL BWP for DL/UL scheduling from the UE. The gNB transmits active DL BWP indication in all configured DL BWP when the gNB-side BWP-timer expired.

Figure 8A:
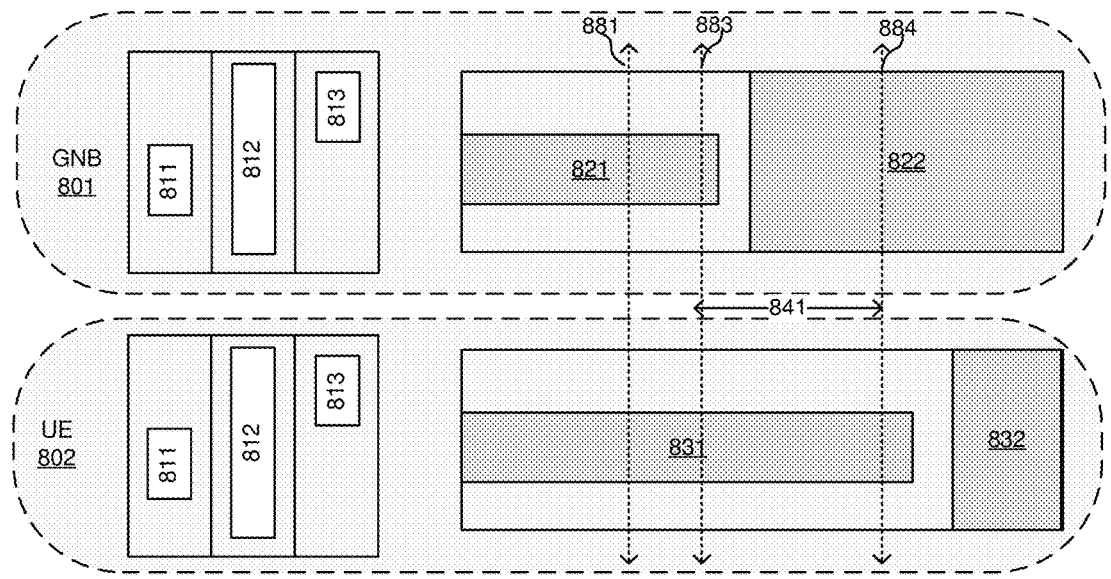
FIG. 8A illustrates exemplary diagrams for an active BWP indication to all BWPs upon UE's miss detection of the previous BWP activation indication in accordance with embodiments of the current invention.

FIG. 8A illustrates exemplary diagrams for an active BWP indication to all BWPs upon UE's miss detection of the previous BWP activation indication in accordance with embodiments of the current invention. A UE 802 is connected with a gNB 801. The UE is configured with BWPs 811, 812, and 813. UE 802 is configured with BWP 811 and operates at 831. At step 881, gNB 801 sends BWP switch signal to UE 802 to switch to BWP 812. In one embodiment, the BWP switch signal is sent using DCI. In other embodiments, other signals such as RRC signaling and MAC CE can be used. UE 802, however, failed to detect the BWP switch signal. At step 883, gNB 801 detects no UL transmission from UE 802 and starts a gNB-side BWP-timer with a gNB-side BWP-timer value of 841 and continues monitoring the UL transmission from UE 802 at BWP 812. In one embodiment, timer value 841 is preconfigured or predefined. When the gNB-side BWP-timer with timer value 841 expired and no transmission is detected at BWP 812 from UE 802, gNB 801 transmits active DL BWP indication again in all configured DL BWP for UE 802. At step 884, UE 802 detects the BWP switch indication through BWP 811. After a switching gap, UE 802 switches to BWP 812 as indicated in the BWP switch indication from gNB 801 and operates in block 832.

Figure 8B:
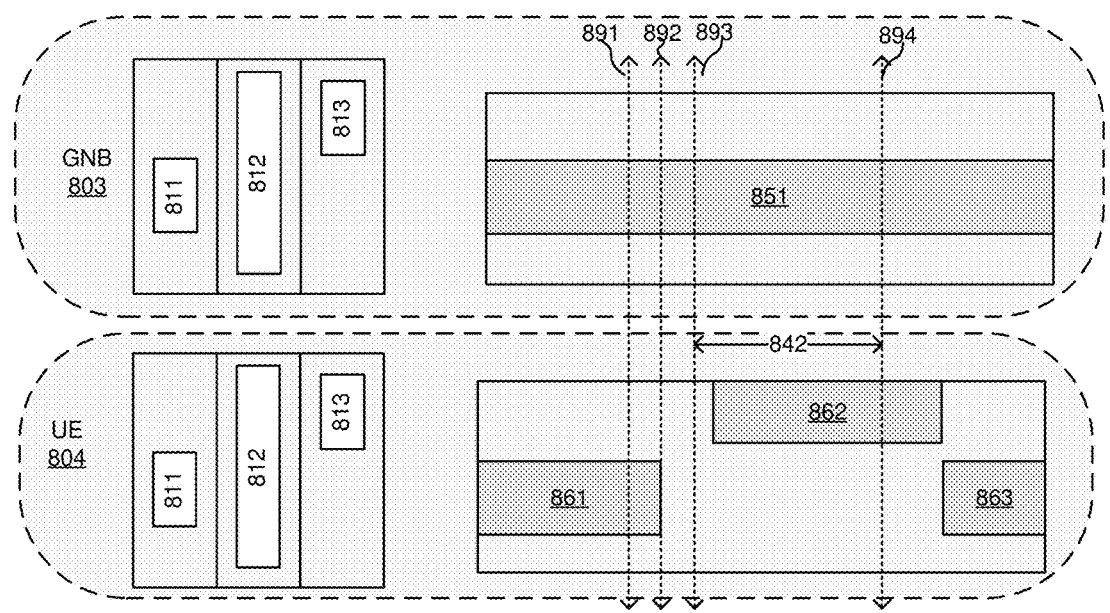
FIG. 8B illustrates exemplary diagrams for an active BWP indication to all BWPs upon UE's miss detection of the previous BWP activation indication in accordance with embodiments of the current invention.

FIG. 8B illustrates exemplary diagrams for an active BWP indication to all BWPs upon UE's miss detection of the previous BWP activation indication in accordance with embodiments of the current invention. A UE 804 is connected with a gNB 803. The UE is configured with BWPs 811, 812, and 813. UE 804 is configured with BWP 811 and operates at 861. At step 891, UE 804 false detects a BWP switch signal. At step 892, UE 802 stops operating at BWP 811 and subsequently switched to BWP 813 at block 862. After UE 803 switched away from BWP 811 at step 892, subsequently, at step 893, gNB 803 detects no UL transmission from UE 804 and starts a timer 842 and continues monitoring the UL transmission from UE 804 at BWP 811. When timer 842 expired, at step 894, and no transmission is detected at BWP 811 from UE 804, gNB 803 transmits active DL BWP indication in all configured DL BWP for UE 802 to active BWP 811. At step 894, UE 804 detects the BWP switch indication through BWP 813 at block 862. After a switching gap, UE 804 switches to BWP 811 as indicated in the BWP switch indication from gNB 803 and operates in block 862.

Figure 9:
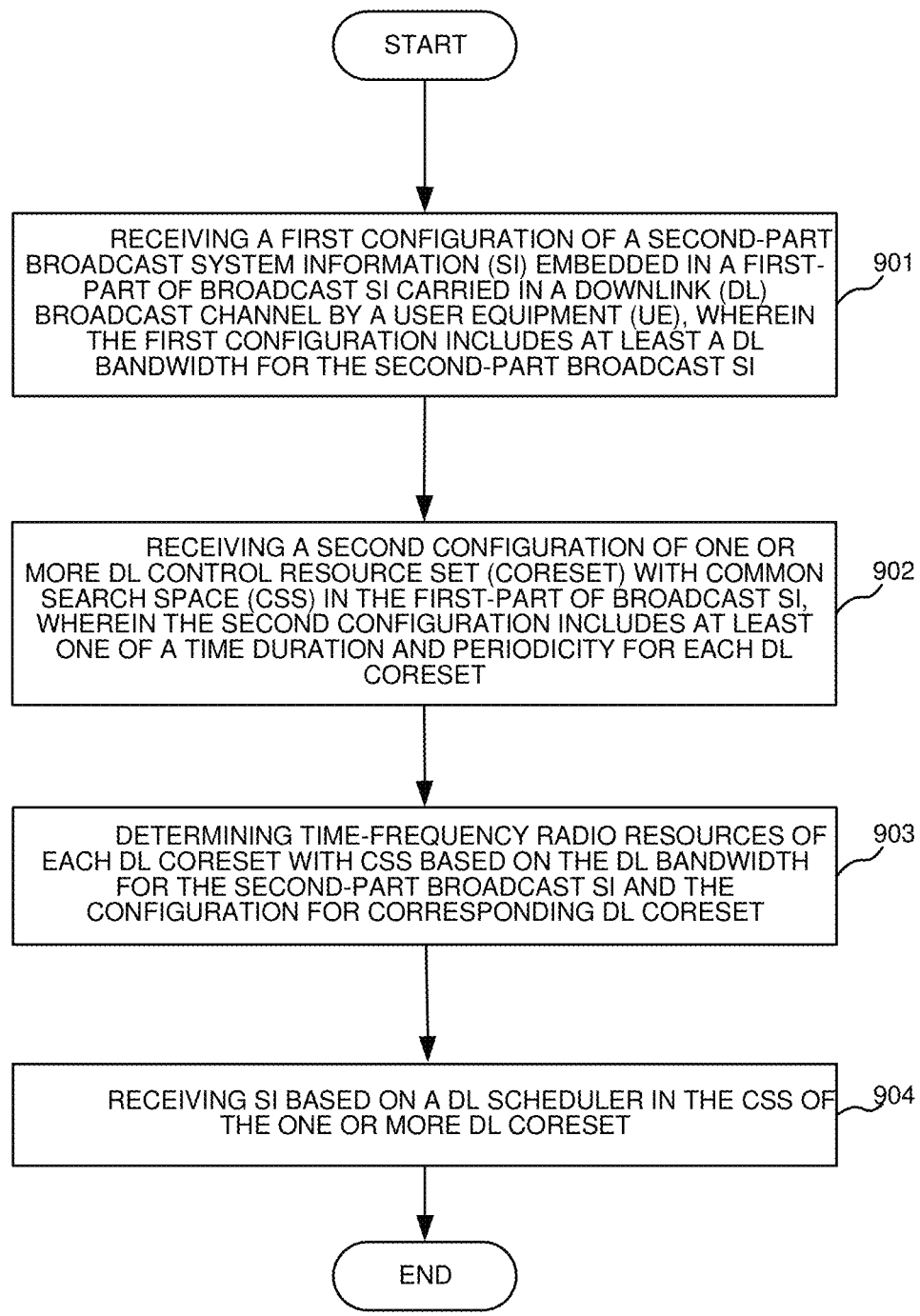
FIG. 9 illustrates an exemplary flow chart for BWP and CORESET configuration in accordance with embodiments of the current invention.

FIG. 9 illustrates an exemplary flow chart for BWP and CORESET configuration in accordance with embodiments of the current invention. At step 901, the UE receives a first configuration of a second-part broadcast system information (SI) embedded in a first-part of broadcast SI carried in a downlink (DL) broadcast channel, wherein the first configuration includes at least a DL bandwidth for the second-part broadcast SI. At step 902, the UE receives a second configuration of one or more DL CORESET with CSS in the first-part of broadcast SI, wherein the second configuration includes at least one of a time duration and periodicity for each DL CORESET. At step 903, the UE determines time-frequency radio resources of each DL CORESET with CSS based on the DL bandwidth for the second-part broadcast SI and the configuration for corresponding DL CORESET. At step 904, the UE receives SI based on a DL scheduler in the CSS of the one or more DL CORESET.

Figure 10:
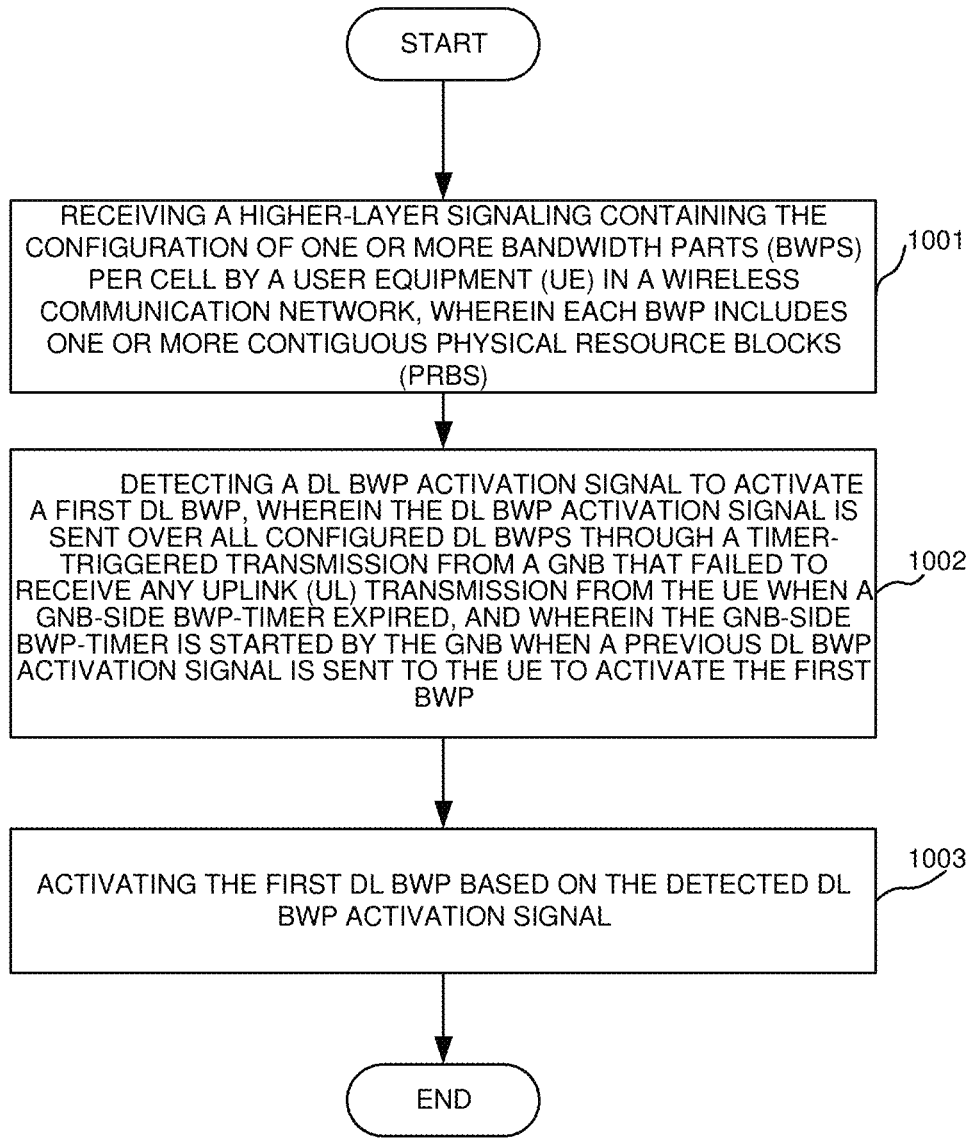
FIG. 10 illustrates an exemplary flow chart for timer-triggered transmission of active DL BWP indication in all DL BWP in accordance with embodiments of the current invention.

FIG. 10 illustrates an exemplary flow chart for timer-triggered transmission of active DL BWP indication in all DL BWP in accordance with embodiments of the current invention. At step 1001, the UE receives a higher-layer signaling containing the configuration of one or more BWPs per cell in a wireless communication network, wherein each BWP includes one or more contiguous PRBs. At step 1002, the UE detecting a DL BWP activation signal to activate a first DL BWP, wherein the DL BWP activation signal is sent over all configured DL BWPs through a timer-triggered transmission from a gNB that failed to receive any UL transmission from the UE when a gNB-side BWP-timer expired, and wherein the gNB-side BWP-timer is started by the gNB when a previous DL BWP activation signal is sent to the UE to activate the first BWP. At step 1003, the UE activates the first DL BWP based on the detected DL BWP activation signal.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a first configuration of a second-part broadcast system information (SI) embedded in a first-part of broadcast SI carried in a downlink (DL) broadcast channel by a user equipment (UE), wherein the first configuration includes at least a DL bandwidth for the second-part broadcast SI;
   receiving a second configuration of one or more DL control resource set (CORESET) with common search space (CSS) in the first-part of broadcast SI, wherein the second configuration includes at least one of a time duration and periodicity for each DL CORESET;
   determining time-frequency radio resources of each DL CORESET with CSS based on the DL bandwidth for the second-part broadcast SI and the configuration for corresponding DL CORESET; and receiving SI based on a DL scheduler in the CSS of the one or more DL CORESET.

2. The method of claim 1, wherein each DL CORESET with CSS is configured as a type-1 CSS or a type-2 CSS, and wherein the type-1 CSS is configured for broadcast messages and the type-2 CSS is configured for multicasting messages, and one or more bandwidth parts (BWPs) is configured for the UE, and wherein a BWP includes a plurality of contiguous physical resource blocks (PRBs).

3. The method of claim 2, wherein a first BWP is configured as an active BWP and at least one of other BWPs is configured with one CORESET with the type-1 CSS for a primary cell (PCell).

4. The method of claim 2, wherein each configured BWP includes one CORESET with the type-2 CSS for a primary cell (PCell) and one or more secondary cells (SCells).

5. The method of claim 2, wherein each configured BWP includes at least one CORESET with UE-specific search space for a primary cell (PCell) and one or more secondary cells (SCells).

6. The method of claim 2, wherein a first BWP is configured as an active BWP and for each configured DL BWP on a primary (PCell) at least one type of CORESET with CSS is configured comprising a type-1 CSS for SI, a type-1 CSS for paging, and a type-2 CSS for random access.

7. The method of claim 1, wherein the second configuration includes at least one of CORESET configuration elements comprising: a time duration of the CORESET within a slot, and a periodicity of a CORESET burst.

8. The method of claim 7, wherein the second configuration further comprising: a number of contiguous slots where the CORESET exists in one periodicity.

9. The method of claim 1, wherein each configured BWP for a primary cell (PCell) includes a UE-specific CORESET.

10. The method of claim 1, wherein at least one configured BWP for a primary cell (PCell) includes a CSS CORESET.

11. A method, comprising:
receiving a higher-layer signaling containing the configuration of one or more bandwidth parts (BWPs) per cell by a user equipment (UE) in a wireless communication network, wherein each BWP includes one or more contiguous physical resource blocks (PRBs);

detecting a DL BWP activation signal to activate a first DL BWP, wherein the DL BWP activation signal is sent over all configured DL BWPs through a timer-triggered transmission from a gNB that failed to receive any uplink (UL) transmission from the UE when a gNB-side BWP-timer expired, and wherein the gNB-side BWP-timer is started by the gNB when a previous DL BWP activation signal is sent to the UE to activate the first BWP; and activating the first DL BWP based on the detected DL BWP activation signal.

12. The method of claim 11, wherein the activation signaling is explicitly carried in downlink control information (DCI).

13. The method of claim 12, wherein the DCI is a dedicated DCI for active BWP switching.

14. The method of claim 12, wherein the DCI is a dedicated DCI for DL/UL scheduling.

15. A user equipment (UE), comprising:
a transceiver that transmits and receives radio frequency (RF) signals from one or more base stations (BS) in wireless network;

a memory to store configurations of one or more bandwidth parts (BWPs) per cell for the UE based on a received higher-layer signaling from a base station in a wireless communication network, wherein each BWP includes a plurality of continuous physical resource blocks (PRBs), and wherein the UE is configured with a primary cell (PCell) and one or more secondary cells (SCells);

a CORESET configurator that receives a first configuration of a second-part broadcast system information (SI) embedded in a first-part of broadcast SI carried in a downlink (DL) broadcast channel by the UE, wherein the first configuration includes at least a DL bandwidth for the second-part broadcast SI, receives a second configuration of one or more DL control resource set (CORESET) with common search space (CSS) in the first-part of broadcast SI, wherein the second configuration includes at least one of a time duration and periodicity for each DL CORESET, and determines time-frequency radio resources of each DL CORESET with CSS based on the DL bandwidth for the second-part broadcast SI and the time duration for corresponding DL CORESET; and a SI receiver that receives SI based on a DL scheduler in the CSS of the one or more DL CORESET.

16. The UE of claim 15, wherein each DL CORESET with CSS is configured as a type-1 CSS or a type-2 CSS, and wherein the type-1 CSS is configured for broadcast messages and the type-2 CSS is configured for multicasting messages.

17. The UE of claim 16, wherein a first BWP is configured as an active BWP and at least one of other BWPs is configured with one CORESET with the type-1 CSS for the PCell.

18. The UE of claim 16, wherein each configured BWP includes one CORESET with the type-2 CSS for the PCell and the one or more SCells.

19. The UE of claim 16, wherein each configured BWP includes at least one CORESET with UE-specific search space for the PCell and the one or more SCells.

20. The UE of claim 16, wherein a first BWP is configured as an active BWP and for each configured DL BWP on the PCell at least one of CORESET with CSS is configured comprising a type-1 CSS for SI, a type-1 CSS for paging, and a type-2 CSS for random access is configured.

21. The UE of claim 15, wherein the second configuration includes at least one of the CORESET configuration comprising: a time duration of the CORESET within a slot, and a periodicity of a CORESET burst.

22. The UE of claim 21, wherein the second configuration further comprising: a number of contiguous slots where the CORESET exists in one periodicity.

23. The UE of claim 15, wherein each configured BWP for a PCell includes a UE-specific CORESET.

24. The UE of claim 15, wherein at least one configured BWP for a PCell includes a CSS CORESET.

25. The UE of claim 15, further comprising:
a BWP activator that detects a DL BWP activation signal to activate a first BWP, wherein the DL BWP activation signal is sent to all configured BWPs through a timer-triggered transmission from a gNB that failed to receive any uplink (UL) transmission from the UE when a BWP-timer expired, and wherein the BWP-timer is started by the gNB when a previous BWP activation signal is sent to the UE to activate the first BWP, and activates the first BWP based on the detected DL BWP activation signal.

26. The UE of claim 25, wherein the activation signaling is explicitly carried in downlink control information (DCI).

27. The UE of claim 26, wherein the DCI is a dedicated DCI for active BWP switching.

28. The UE of claim 26, wherein the DCI is a dedicated DCI for DL/UL scheduling.

\* \* \* \* \*